J. ST. V. PLETTS.
VARIABLE SPEED POWER TRANSMISSION.
APPLICATION FILED FEB. 10, 1913.
1,069,463.
Patented Aug. 5, 1913.
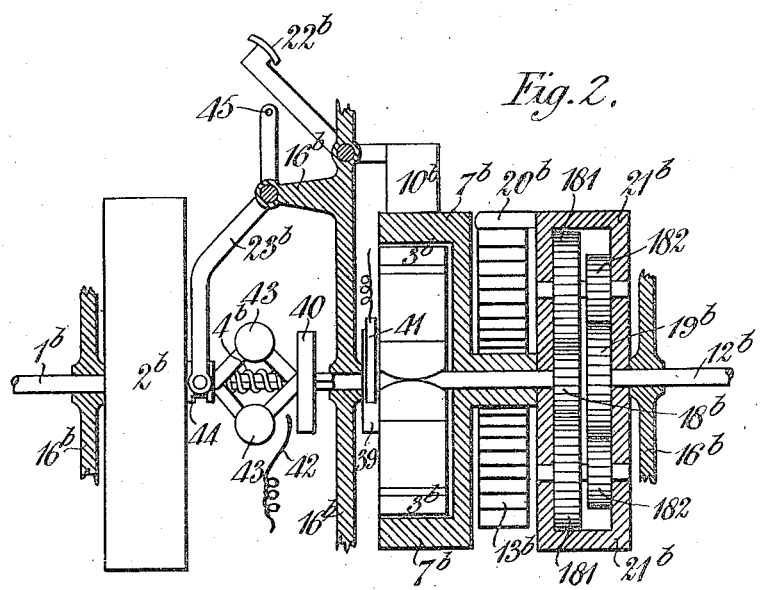
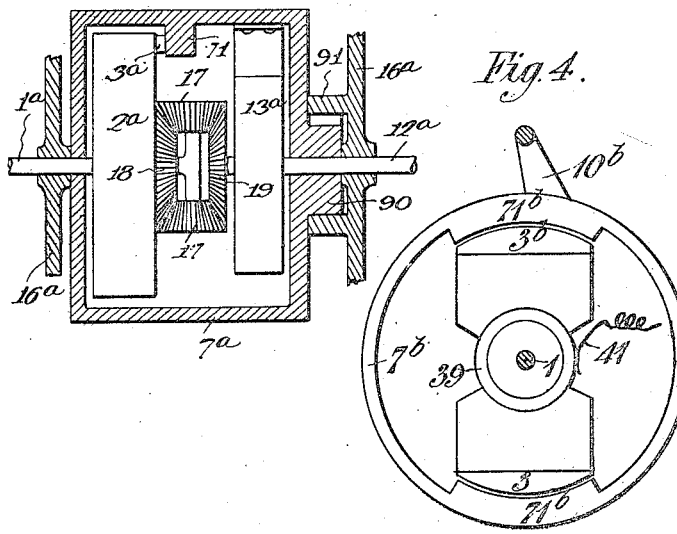
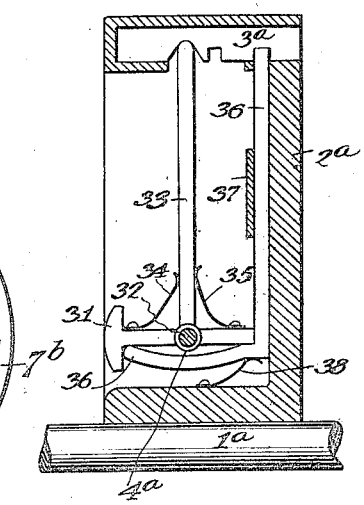
Witnesses.
Inventor.
John St. Vincent Pletts
By his Attorneys

UNITED STATES PATENT OFFICE.

JOHN ST. VINCENT PLETTS, OF SURBITON, ENGLAND.

VARIABLE-SPEED POWER TRANSMISSION.

1,069,463.

Specification of Letters Patent.   Patented Aug. 5, 1913.

Application filed February 10, 1913. Serial No. 747,355.

*To all whom it may concern:*

Be it known that I, JOHN ST. VINCENT PLETTS, a subject of the King of Great Britain, residing at Shalston House, Ewell Road, Surbiton, in the county of Surrey, England, have invented new and useful Improvements in Variable-Speed Power Transmission, of which the following is a specification.

This invention relates to improvements in variable speed power transmission, and has for its object the transmission of constant or approximately constant power from a source of power running at constant or approximately constant speed to a sink of power running at a speed which may vary between wide limits, the load therefore being moved at the greatest or nearly the greatest possible speed with the power available. One of the principal uses of such a mechanism is on a motor car where an engine of limited power is required to give a large torque for starting and for climbing hills, and in what follows I will for convenience describe the mechanism in reference to a motor car, though its employment is by no means confined thereto.

According to this invention the energy or some of the energy derived from the engine (except when the torque derived directly from the latter is sufficient for the load) is first stored in a flywheel, and then intermittenly transferred to a spring, from which it is supplied to the wheels. As the energy stored in a flywheel varies with the square of its angular velocity and that stored in a spring with the square of its torque, it follows that the energy, which is derived from the enigne at constant or approximately constant speed and torque, is stored in the spring with increasing torque until the road wheels move at a speed which makes the power supplied to them equal or nearly equal to that developed by the engine.

Various forms embodying my invention are shown in the accompanying drawings in which—

Figure 1 is a longitudinal section; Fig. 2 is a similar section of a modification; Fig. 3 is an enlarged half section of the flywheel shown in Fig. 1 and Fig. 4 is an end view of the clutch shown in Fig. 2.

In Figs. 1 and 3 the engine shaft $1^a$ has fixed to it the differential gear wheels 17. The flywheel $2^a$ turns upon the shaft $1^a$ and is fast with one of the side wheels 18 of the differential gear. The other side wheel 19 of the differential gear is fixed to the shaft $12^a$ which drives the road wheels. The flywheel is provided with centrifugally operated teeth $3^a$ which at the predetermined speed come out and engage corresponding teeth 71 on the other clutch member $7^a$. This clutch member which is in the form of a cylindrical box turns freely upon the shafts $1^a$ and $12^a$ and has fixed to it a free wheel device 90 with rollers 91 which engage with the frame $16^a$ and prevent rotation in one direction. The spring $13^a$ which is in the form of a flat spiral is fixed at one end to the shaft $12^a$ and at the other end to the clutch member $7^a$.

The centrifugal part 31 turns upon a pin 32 fixed on the flywheel. A rod 33 also turns upon the pin 32 and is moved by springs 34 and 35 fixed to the part 31. The other end of the rod 33 moves the tooth $3^a$ which slides in a slot in the rim of the flywheel. A catch 36 which engages notches in the tooth $3^a$ slides in a guide 37 and is pressed outward by a spring 38 and inward by the ends of the part 31 when the latter moves in either direction. The part 31 is held inward by the controlling spring $4^a$ wound on the pin 32 but at a certain speed takes up the position shown and at higher speeds moves further outward causing the spring 34 to press against the rod 33. When the part 31 moves out sufficiently its other end presses against the catch 36 releasing the tooth $3^a$ which flies out engaging the corresponding tooth 71 (Fig. 2). As the speed decreases the part 31 returns to the position shown and the catch 36 is pushed by the spring 38 into the other notch in the tooth $3^a$. At a still lower speed the catch 36 is again withdrawn and the tooth $3^a$ flies in under the pressure of the spring 35. This trigger action not only causes the clutch to act suddenly but also causes it to come into operation at a higher speed than it goes out of operation which is an advantage in some cases. With this arrangement a portion of the engine torque on the shaft $1^a$ is transmitted directly to the shaft $12^a$ through the gear wheels 17 and 19 and the spring has only to provide the difference between this and the torque of the wheels. The clutch instead of coming into operation at a predetermined engine speed comes into operation at a predetermined speed of the flywheel. Thus the engine speed at which the clutch comes into operation varies from a minimum when the car is stationary to a maximum when it is traveling at full speed, which is an advantage with an engine capable of developing its power over a wide range of speed.

If the power developed by the engine be reduced the car will run slower, and when the power is insufficient to drive the engine and flywheel at the speed necessary to operate the clutch the car will come to rest. Thus with this form of the mechanism no other clutch is necessary.

In Figs. 2 and 3 which show a second form of the mechanism the engine is connected to the shaft $1^b$ to which are fixed the flywheel $2^b$, the poles $3^b$ of an electro-magnetic clutch member and the gear wheel $18^b$. The other clutch member $7^b$ is connected to one end of the spring $13^b$ and is only free to turn in one direction owing to the freewheel device or pawl $10^b$. The other end of the spring $13^b$ is connected to a projection $20^b$ on the epicyclic gear box $21^b$ which turns on the shafts $1^b$ and $12^b$. The gear wheel $18^b$ meshes with the gear wheels 181 and the gear wheel $19^b$ is fixed to the shaft $12^b$ and meshes with the gear wheels 182. The gear wheels 181 and 182 are journaled in the box $21^b$ thus forming a rotatable epicyclic speed reducing gear. The windings of the electromagnet are connected to slip rings 39 and 40 which are supplied with current through brushes 41 and 42. When the circuit is closed the poles $3^b$ are magnetized and attract the pole projections $71^b$ of the clutch member $7^b$ which owing to the free-wheel device $10^b$ can only rotate in the same direction. 43 is a governor which pulls the slip ring 40 along the squared part of the shaft $1^b$ and brings it into contact with the brush 42. The other end 44 of the governor 43 also slides along the squared part of the shaft $1^b$ and may be moved by the lever $23^b$ which is actuated as described below and to which is attached a cord at 45. It is evident that the speed at which the circuit is closed and the clutch brought into operation may be adjusted at will by means of the lever or cord. With this arrangement when the engine is running below the speed at which the clutch comes into operation the box $21^b$ does not rotate and the maximum torque is supplied to the wheel shaft $12^b$ direct through the gear wheels $18^b$, 181, 182 and $19^b$. When the car gathers speed the engine runs faster and the clutch comes into operation winding up the spring $13^b$ and causing the box $21^b$ to rotate. As this throws the whole torque on to the engine it is slowed down until the clutch comes out of operation when owing to the free wheel device $10^b$ the torque of the spring $13^b$ is taken by the frame $16^b$ and the box $21^b$ continues rotating. The engine having now to supply only a portion of the torque runs faster again and the same cycle is repeated so that the box with its gear wheels 181 and 182 is kept rotating. As the increase in the speed of the car is proportional to the speed of rotation of the box it is obvious that the latter will rotate faster and faster as the car gathers further speed. Similarly, it is obvious that since the average power and speed of the engine only vary between narrow limits the torque on the wheels must vary inversely as the speed of the car, that is to say, from a maximum when the box is stationary to a minimum when it is rotating at the same speed as the engine. This latter condition occurs when the torque of the engine is sufficient for the load, for the clutch then remains in operation and the box $21^b$ and consequently the wheel shaft $12^b$ rotate at the same speed as the engine. Thus at the minimum and maximum speed of the car there is an even turning moment on the wheels, and only at intermediate speeds does the clutch alternately come into and go out of operation. In this form of the mechanism the car will not come to rest merely by reducing the speed of the engine. But a pedal lever $22^b$ is provided which on being depressed raises the free-wheel device or pawl $10^b$ and releases the clutch member $7^b$ allowing it to rotate in either direction. This frees the engine when it is running below the speed at which the clutch comes into operation and allows the car to come to rest without stopping the engine. As it may be necessary to stop the car at any engine speed an additional device is provided which prevents the clutch coming into operation. The lever $22^b$ when depressed comes against the lever $23^b$ compressing the controlling spring $4^b$ and preventing the closing of the electric circuit of the magnetic clutch.

In both forms of the mechanism shown when the fly-wheel or engine shaft reaches a predetermined speed the clutch is automatically set to wind up the spring which opposes the engine with increasing torque. This slows the engine down releasing the clutch but the free wheel device or pawl prevents the unwinding of the spring except as this may occur through the rotation of the driven shaft $12^a$ Fig. 1, or $12^b$ Fig. 2 for the spring exerts a constant but varying torque on the driven shaft and supplements the torque exerted directly on the shaft through the train of gearing between the engine shaft and driven shaft. The engine shaft being unclutched or freed from the resistance of the spring speeds up and stores its energy in the flywheel with increasing speed until the clutch comes into operation again. The energy gained by the fly-wheel in this interval is then transferred to and accumulated in the spring increasing its torque, and this cycle is repeated again and again accumulating more and more energy until the torque is sufficient to move the load. If the load is great (as when climbing a hill) the above cycle continues, maintaining the torque and winding up the spring at the same average rate as it is unwound by the axle. If the load is not great the car gathers speed and the intervals during which the fly-wheel and spring are unclutched occur less frequently until the engine is continually clutched through the spring to the wheels and the engine shaft and driven shaft rotate in unison at the same speed.

It will be noted that there is a direct differential drive gear train between the engine shaft and driven shaft through which a portion of the torque is transmitted but the power gained in the acceleration of the fly-wheel is accumulated in the spring and by it transmitted to the driven shaft, the spring thus constituting a secondary source of energy which is automatically supplied and replenished as the necessity for its application arises. The arrangement prevents the stalling of the engine under an increase in resistance and permits the use of an engine of limited power even when a much greater torque than can be derived directly from the engine is required, for example, in starting a motor vehicle in climbing a steep grade or even in accelerating the speed to a desired normal speed.

What I claim is:—

1. In means for transmitting power at variable speeds, the combination of an engine shaft, a fly-wheel rotated thereby, two clutch members, means dependent on the speed for causing the first member to engage the second, a driven shaft, a spring connecting the second member to the driven shaft, means for preventing the backward rotation of the second member, and means for transmitting a portion of the torque derived from the engine shaft directly to the driven shaft at the same time but independently of the spring.

2. In mechanism for transmitting power at variable speeds, the combination with an engine shaft, a fly-wheel rotated thereby, a driven shaft and a differential drive gearing between the engine and driven shafts, of a spring connected with the driven shaft to supplement the torque imparted thereto through the differential gearing and means for coupling said spring with the fly-wheel to rewind the same, controlled by the speed of the fly-wheel whereby excess power accumulated in the movement of the fly-wheel is stored in the spring and transmitted at a different rate to the driven shaft.

3. In mechanism for transmitting power at variable speeds, the combination with the engine shaft, a fly-wheel rotated thereby, a driven shaft and a differential drive gearing between the engine and driven shafts, of a spring connected at one end with the driven shaft to supplement the torque imparted thereto, a centrifugally controlled clutch for coupling the fly-wheel with the opposite end of the spring when the angular velocity of the fly-wheel is augmented and means for preventing reverse movement of said last mentioned end of the spring.

4. In mechanism for transmitting power at variable speeds, the combination with the engine shaft, a fly wheel rotated thereby, a driven shaft, a spring connected at one end with the driven shaft and a centrifugally controlled clutch for coupling the fly wheel and opposite end of the spring when the speed of the fly wheel reaches a predetermined rate, of means whereby the coupling of the engine and driven shaft through the spring may be prevented at the will of the operator to permit of the free operation of the engine shaft and fly wheel.

5. In mechanism for transmitting power at variable speeds, the combination with the engine shaft, a fly wheel rotated thereby, a driven shaft, a spring connected at one end with the driven shaft, and a centrifugally controlled clutch for coupling the fly wheel and opposite end of the spring whereby the spring will be intermittently re-wound and transmit a continuous torque to the driven shaft, of means controlled by the operator for holding the connections out of operative engagement to permit of free rotation of the fly wheel and engine shaft, whereby the driven shaft may come to rest without stopping the engine shaft.

6. In power transmitting mechanism, the combination with the engine shaft, a fly wheel rotated thereby, a driven shaft, spring connected at one end with the driven shaft and centrifugally controlled clutch for coupling the fly wheel and other end of the spring when the engine shaft rotates at a predetermined speed, of means for preventing reverse movement of the last mentioned end of the spring, and means for simultaneously releasing the same and holding the clutch out of operative engagement, whereby the driving and driven shafts are left free to rotate independently.

7. In power transmitting mechanism, the combination with the engine shaft, a fly wheel rotated thereby, a driven shaft, differential drive gearing between the engine and driven shafts, and a spring connected at one end with the driven shaft, of a centrifugally controlled clutch for coupling the fly-wheel with the opposite end of the spring, means for holding the last mentioned end of the spring against reverse movement when free from the fly wheel, and means controlled by the operator for holding the clutch out of operative engagement.

8. In power transmitting mechanism, the combination with the engine shaft, a fly wheel rotated thereby, a driven shaft and differential gearing between the engine and driven shafts, of a rotary gear casing, a spring connected with the casing, and tending to augment the torque transmitted through the gearing to the driven shaft, a centrifugally controlled clutch for coupling the fly wheel and spring to re-wind the spring when the speed of the fly wheel reaches a predetermined rate, and means to prevent reverse movement of the spring when not coupled with the fly wheel.

JOHN ST. VINCENT PLETTS.

Witnesses:
O. J. WORTH,
W. E. ROGERS.